June 20, 1944. H. STRÜBIG 2,351,889
METHOD AND MEANS FOR PRODUCING TELEVISION IMAGES
Filed Sept. 26, 1940
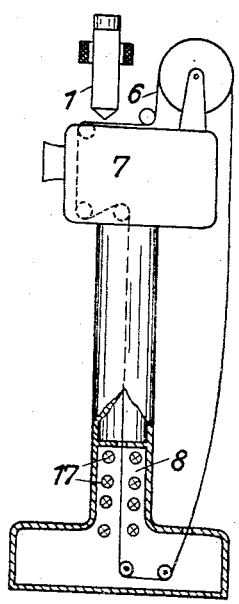
Fig. 1
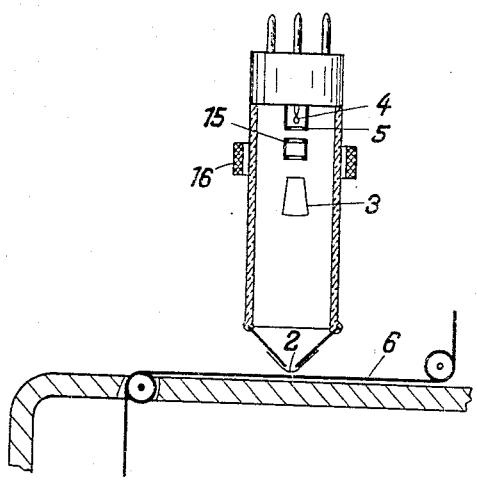
Fig. 2
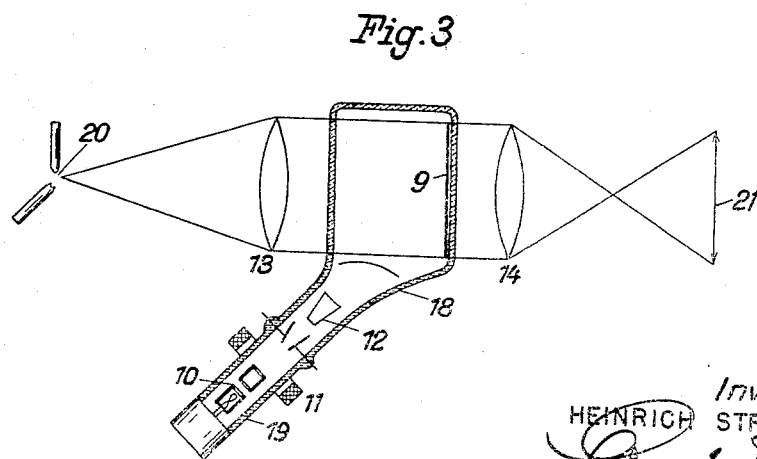
Fig. 3
Inventor:
HEINRICH STRÜBIG
BY
ATTORNEY Patented June 20, 1944

2,351,889

UNITED STATES PATENT OFFICE 2,351,889

METHOD AND MEANS FOR PRODUCING TELEVISION IMAGES

Heinrich Strübig, Teltow, Germany; vested in the Alien Property Custodian

Application September 26, 1940, Serial No. 358,511
In Germany October 7, 1939

6 Claims. (Cl. 250—164)

The invention relates to methods and means for producing images upon a screen which can be viewed from the front or rearside and in particular for the projection of television images upon a screen having a large surface by means of cathode ray tubes.

It is an object of the invention to produce a bright television image on the receiving side by making use of the principle of optical storage of picture elements. It is another object to utilize a transparent medium or substance which under normal conditions has no colour but which assumes a colour or a dark shade under the influences of impacting electrons. It is a further object to use a material the transparency or opacity of which can be varied by the direct impact of electrons and which retains its opacity for a desired period. The colouring or darkening can be reversed by a simple process after the image has been used for the projection or after it has been viewed by the observer so that a new image can be produced on the same screen.

A further object is to improve the systems in which an image is produced by providing a substance on the bottom of a cathode ray tube which changes its colour under the influence of heat produced by the bombardment with electrons. Such a substance, for example, silver-mercury-iodide, has the property of changing its colour from red into yellow with higher temperatures. Experiments have shown that such substances have a high vapour pressure so that they cannot readily be used in high vacuum vessels. Furthermore these images cannot be projected as diapositives because the dark and bright portions have nearly the same opacity.

According to the invention the image is produced upon a layer consisting of an alkaline earth halide on a transparent carrier by direct electron impact. The method has the advantage that images with strong, for example, dark-blue contrasts appear upon a colourless or transparent background so that they can be easily projected.

The alkaline earth halides have the property that they change their colour under the influence of fast electrons; for example, rock salt (HCl) changes its colour from clear transparency to a yellow colour. This colouring can be quickly and completely reversed by heating the material for a short time or by exposing it to infrared light. Examples of such materials are the chlorides, bromides and iodides of sodium and potassium, lithium bromide, calcium fluoride, and strontium fluoride and chloride. The material may be in the form of a single flat crystal, but it is, however, preferable to use a layer of small crystals or a layer having a micro-crystalline structure.

A substance which is particularly sensitive to cathode rays and shows a good colouring effect is potassium bromide or a mixture of potassium bromide (KBr) and potassium hydride (KH). The potassium hydride is preferably added as an activator so that the layer contains for example, 1000 parts potassium bromide and 1 part potassium hydride. A layer composed in this manner becomes dark-blue or black under the influence of fast electrons. A screen composed of a material of this type can be used as a light relay in a projection apparatus.

Other aspects of my invention will be apparent or will be specifically pointed out in the description forming a part of this specification, but I do not limit myself to the embodiment of the invention herein described, as various forms may be adopted within the scope of the appended claims.

Referring to the drawing

Fig. 1 shows a view of a device including a film for the projection of images,

Fig. 2 is a section through a cathode ray tube for producing the images, and

Fig. 3 is a section through a cathode ray tube used in a projection apparatus.

The cathode ray tube 1 of Fig. 1 is represented in Fig. 2 on a larger scale. The tube 1 includes a Lenard-window 2 having the form of a slot covered with a foil of aluminum or another suitable material. The tube contains furthermore a deflecting system 3 consisting of plates, a heated cathode 4 and a control-electrode 5 as well as one or more lens-electrodes 15. The tube is surrounded by a concentrating coil 16. In front of the tube 1 a film 6 is arranged. The film carries a thin layer of potassium bromide in the form of finely divided crystals. This layer is directed towards the window 2 of the tube 1. The potassium bromide is applied to the film and connected thereto by means of a suitable binder, for example, a transparent lacquer. The arrangement of Fig. 1 contains furthermore a film projector 7 of known construction and a heating chamber 8 including a number of heating elements, for example, in the form of electrically heated wires or of electrical incandescent lamps 17. In the heating chamber the film is exposed to the heat of the heating elements so that the image is removed and the potassium bromide returned to its original state. As the image produced in the layer of potassium bromide is sensitive to heat it is preferable to employ in the projection apparatus a heat filter, for example, in the form of a water container, through which the light rays are made to pass in order to prevent the image from being destroyed during the projection. A suitable motor is arranged in the projection apparatus 7 for moving the film through the device.

The operation of the device is as follows:

The cathode ray tube 1 is connected to a terminal of a television receiver so that the control electrode 5 is controlled by image currents. The cathode ray is moved under the influence of the line deflecting system across the Lenard window in synchronism with the scanning movement at the transmitting end. If the film covered with the potassium bromide is moved with uniform speed perpendicularly to the direction of the line, the potassium bromide is changed in its colour line by line in accordance with the intensity of the cathode ray passing through the Lenard-window, so that a reproduction of the image is produced on the film.

The direction of the image impulses is chosen in such a manner that the image on the film is a positive image. This image is projected immediately by means of the projection apparatus 7 and is wiped out in the heating chamber 8. The length of film required for this device is comparatively short and is chiefly determined by the length of film required in the heating chamber for completely eliminating the image. A certain length of film is required for forming loops between the intermittently operating projector and the continuously moved remaining part of the film.

As the potassium bromide has an absorption in the yellow part of the spectrum, it is advantageous either to use for the projection apparatus a source of light emitting a comparatively small portion of blue and a large portion of yellow rays, for example, a sodium vapour lamp, or to employ a yellow projection screen or a yellow light filter. It is, however, also possible to obtain a black and white image with white light. In this case thin layers of a substance absorbing blue rays and another substance absorbing yellow rays, for example, potassium bromide and rock-salt, are placed one upon the other. Images with such a system have purely black and white contrasts.

Another embodiment represented in Fig. 3 shows a cathode ray tube in which a layer of potassium bromide 9 is arranged within the tube envelope 18. The electron-gun 10 is arranged in the neck 19 of the tube so that the screen 9 can be arranged in the path of an optical system including a condenser 13 and a projection lens 14. Contrary to the embodiment of Figs. 1 and 2, the cathode ray tube requires in this case a second deflecting system 12 besides the deflecting system 11. The lens system including the condenser 13 and the objective 14 directs the light of an arc lamp 20 towards a projection screen 21. The image is made to disappear by passing over the screen a ray of infrared light. The cross-section of this ray corresponds approximately to the length and the height of one or more lines and is moved across the image with such a speed that the light-ray impinges upon a portion of the screen which is situated shortly in front of the line scanned by the cathode ray. Each point of the image screen is therefore prepared for receiving a new impression shortly before the cathode ray scans this point of the carrier.

In case the layer consisting of small crystals is fastened to the carrier in such a manner that the crystal particles are in contact with the carrier at one side only, the complete layer has a white appearance so that a very strong source of light is required for producing bright images. A considerable improvement can be obtained by embedding the crystal powder in a transparent mass having the same refractive properties as the crystals. In this case the screen is clear and transparent when no picture is excited thereon. The crystals are embedded in such a manner that the binder covering the crystals is very thin so that the electrons can easily pass through the binding material and act upon the crystals.

What I claim is:

1. In combination, a source of cathode rays, means for modulating the intensity of said cathode rays in accordance with picture signals, an image screen comprising a layer of at least one alkaline earth halide in crystalline state deposited upon a transparent carrier, means for successively bombarding elemental areas of said screen with said cathode rays for changing the transparency thereof in accordance with the intensity of said cathode rays, said screen being adapted to be exposed to a uniform flow of light for modulating elemental areas of said flow in accordance with said picture signals.

2. In combination, a source of cathode rays, means for modulating the intensity of said cathode rays in accordance with picture signals, an image screen comprising a layer of potassium bromide deposited upon a transparent carrier, means for successively bombarding elemental areas of said screen with said cathode rays, for changing the transparency thereof in accordance with the intensity of said cathode rays, said screen being adapted to be exposed to a uniform flow of light for modulating elemental areas of said flow in accordance with said picture signals.

3. In combination, a source of cathode rays, means for modulating the intensity of said cathode rays in accordance with picture signals, an image screen comprising a layer consisting of a mixture of potassium bromide and potassium hydride deposited upon a transparent carrier, means for successively bombarding elemental areas of said screen with said cathode rays for changing the transparency thereof in accordance with the intensity of said cathode rays, said screen being adapted to be exposed to a uniform flow of light for modulating elemental areas of said flow in accordance with said picture signals.

4. In combination, a source of cathode rays, means for modulating the intensity of said cathode rays in accordance with picture signals, an image screen comprising a layer of at least one alkaline earth halide in crystalline state embedded in a transparent binder having the same refractory properties as said alkaline earth halide and deposited upon a transparent carrier, means for successively bombarding elemental areas of said screen with said cathode rays for changing the transparency thereof in accordance with the intensity of said cathode rays, said screen being adapted to be exposed to a uniform flow of light for modulating elemental areas of said flow in accordance with said picture signals.

5. In combination, a source of cathode rays, means for modulating the intensity of said cathode rays in accordance with picture signals, an image screen comprising at least one layer of potassium bromide and one layer of sodium chloride arranged on top of each other and deposited upon a transparent carrier, means for successively bombarding elemental areas of said screen with said cathode rays for changing the transparency thereof in accordance with the intensity of said cathode rays, said screen being adapted to be exposed to a uniform flow of light for modulating elemental areas of said flow in accordance with said picture signals.

6. A cathode ray tube comprising an evacuated glass envelope having a first plane window portion, an image screen comprising a layer of at least one alkaline earth halide in crystalline state deposited on said window portion, a source of cathode rays, means for modulating the intensity of said rays in accordance with picture signals, means for deflecting the modulated rays across said image screen for successively changing the transparency of elemental areas thereof in accordance with the intensity of said cathode rays, said envelope being provided with a second window portion deposited opposite said first window portion and adapted to permit light from an external source to pass through said envelope onto said image screen for modulation thereof in accordance with said picture signals.

HEINRICH STRÜBIG.